US011320870B2

(12) United States Patent
Xu et al.

(10) Patent No.: US 11,320,870 B2
(45) Date of Patent: May 3, 2022

(54) FOLDABLE FLEXIBLE SCREEN TERMINAL

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shaopeng Xu, Beijing (CN); Hao Wu, Beijing (CN); Xuzhong Liu, Beijing (CN); Na An, Beijing (CN); Gang Ci, Beijing (CN); Xiao Ma, Beijing (CN); Xinfeng Gong, Beijing (CN); Bin Xu, Beijing (CN); Zhenhua Luo, Beijing (CN); Zheng Zhang, Beijing (CN); Zongwei Luo, Beijing (CN); Qingzhu Guan, Beijing (CN); Wei Su, Beijing (CN); Guochun Wang, Beijing (CN); Zuoxin Yu, Beijing (CN); Dianzhong Liu, Beijing (CN); Jinzhao Zhou, Beijing (CN); Xiaohui Chu, Beijing (CN); Baolei Guo, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 336 days.

(21) Appl. No.: 16/498,047

(22) PCT Filed: Apr. 9, 2019

(86) PCT No.: PCT/CN2019/081940
§ 371 (c)(1),
(2) Date: Sep. 26, 2019

(87) PCT Pub. No.: WO2019/201122
PCT Pub. Date: Oct. 24, 2019

(65) Prior Publication Data

US 2021/0333837 A1 Oct. 28, 2021

(30) Foreign Application Priority Data

Apr. 16, 2018 (CN) .......................... 201810338612.X

(51) Int. Cl.
*G06F 1/16* (2006.01)
*F16C 11/12* (2006.01)

(52) U.S. Cl.
CPC ............ *G06F 1/1681* (2013.01); *F16C 11/12* (2013.01)

(58) Field of Classification Search
CPC ..... G06F 1/1616; G06F 1/1681; G06F 1/1652
See application file for complete search history.

(56) References Cited

U.S. PATENT DOCUMENTS 6,392,871 B1 * 5/2002 Yanase .................... G06F 1/162
345/905
7,636,085 B2 12/2009 Yang
(Continued)

FOREIGN PATENT DOCUMENTS

CN       101163163 A      4/2008
CN       105549682 A      5/2016
(Continued)

OTHER PUBLICATIONS

First Chinese Office Action dated Aug. 26, 2019.

*Primary Examiner* — Anthony Q Edwards
(74) *Attorney, Agent, or Firm* — Dilworth & Barrese, LLP.; Michael J. Musella, Esq.

(57) ABSTRACT

A foldable flexible screen terminal includes: at least two screen terminal portions and a rollable flexible member, two adjacent screen terminal portions being connected by the
(Continued)

rollable flexible member, the rollable flexible member including a plurality of flexible member units and a plurality of bellows structures, each of the plurality of bellows structures being foldable and unfoldable, the plurality of bellows structures including a plurality of first bellows structures, and two adjacent flexible member units being connected by one of the plurality of first bellows structures.

18 Claims, 7 Drawing Sheets

(56) References Cited

U.S. PATENT DOCUMENTS

| | | | |
|---|---|---|---|
| 9,625,947 B2 | 4/2017 | Lee et al. | |
| 9,927,841 B2 * | 3/2018 | Gheorghiu | G06F 1/1681 |
| 10,310,566 B2 * | 6/2019 | Liao | G06F 1/1652 |
| 2002/0067339 A1 * | 6/2002 | Min | G06F 1/1601 |
| | | | 345/156 |
| 2007/0117600 A1 * | 5/2007 | Robertson | G06F 1/1616 |
| | | | 455/575.3 |
| 2016/0014914 A1 | 1/2016 | Stroetmann | |
| 2016/0116944 A1 | 4/2016 | Lee et al. | |
| 2019/0286195 A1 | 9/2019 | Lin | |
| 2019/0287704 A1 | 9/2019 | Lin et al. | |

FOREIGN PATENT DOCUMENTS

| | | |
|---|---|---|
| CN | 106131251 A | 11/2016 |
| CN | 106227634 A | 12/2016 |
| CN | 107846484 A | 3/2018 |
| CN | 108417152 A | 8/2018 |

* cited by examiner

FOLDABLE FLEXIBLE SCREEN TERMINAL

CROSS-REFERENCE TO RELATED APPLICATION

The present application claims priority to Chinese patent application No. 201810338612.X, filed on Apr. 16, 2018, the entire disclosure of which is incorporated herein by reference as part of the present application.

TECHNICAL FIELD

Embodiments of the present disclosure relate to a foldable flexible screen terminal.

BACKGROUND

As an important application technology of organic light-emitting diode (OLED), flexible screens have achieved important development in recent years. Flexible screens have significant advantages over conventional screens, such as being lighter in size and lower in power consumption, and because flexible screens have characteristics of being bendable and flexible, application scenarios thereof have become more and more widespread.

SUMMARY

At least one embodiment of the present disclosure provides a foldable flexible screen terminal, which can be applied to various daily scenarios and has high utility value.

At least one embodiment of the present disclosure provides a foldable flexible screen terminal, including: at least two screen terminal portions; a rollable flexible member, two adjacent screen terminal portions being connected by the rollable flexible member, the rollable flexible member including a plurality of flexible member units and a plurality of bellows structures, each of the plurality of bellows structures being foldable and unfoldable, the plurality of bellows structures including a plurality of first bellows structures, and two adjacent flexible member units being connected by one of the plurality of first bellows structures.

In one or more embodiments of the present disclosure, each of the plurality of flexible member units includes a magnetic strip unit, and magnetic strip units of the adjacent flexible member units are capable of attracting each other to form an integral body.

In one or more embodiments of the present disclosure, the flexible member unit further includes: two lateral retaining walls, located at two ends of the magnetic strip unit, respectively; and an outer retaining wall, spaced apart from the magnetic strip unit and located between the two lateral retaining walls, the outer retaining wall being connected with the two lateral retaining walls, so that the magnetic strip unit, the two lateral retaining walls and the outer retaining wall jointly forming a hollow region.

In one or more embodiments of the present disclosure, the hollow regions of the plurality of flexible member units collectively form a receiving space of the rollable flexible member.

In one or more embodiments of the present disclosure, a micropore structure is arranged on a bellows surface of the bellows structure, the micropore structure is configured to allow air to enter and exit the receiving space and to block liquid from entering the receiving space.

In one or more embodiments of the present disclosure, an air vent is provided in the foldable flexible screen terminal, and the air vent is configured to ventilate the receiving space with an external environment.

In one or more embodiments of the present disclosure, the flexible member unit further includes at least one support pillar, and the at least one support pillar is located between the magnetic strip unit and the outer retaining wall.

In one or more embodiments of the present disclosure, a cross section of the magnetic strip unit has a symmetrical irregular shape.

In one or more embodiments of the present disclosure, the magnetic strip unit includes a top surface, a bottom surface, and two side surfaces between the top surface and the bottom surface, each of the side surfaces includes a first contact surface at an obtuse angle to the top surface and a second contact surface at a right angle to the top surface.

In one or more embodiments of the present disclosure, each of the side surfaces further includes a third contact surface between the first contact surface and the second contact surface, and the third contact surface is connected with the first contact surface and the second contact surface.

In one or more embodiments of the present disclosure, the third contact surface is at an acute angle to the top surface.

In one or more embodiments of the present disclosure, the plurality of bellows structures include a second bellows structure, each of adjacent screen terminal portions is connected to the flexible member unit adjacent to the one of adjacent screen terminal portions via the second bellows structure.

In one or more embodiments of the present disclosure, the foldable flexible screen terminal further includes a flexible screen layer, the flexible screen layer is located on a same side of the at least two screen terminal portions and the rollable flexible member, and the flexible screen layer is configured to serve as a display part of the foldable flexible screen terminal.

In one or more embodiments of the present disclosure, the foldable flexible screen terminal further includes a buffer layer, and the buffer layer is located on a side of the flexible screen layer close to the rollable flexible member, and is configured to bond the flexible screen layer to the at least two screen terminal portions and the rollable flexible member.

In one or more embodiments of the present disclosure, the foldable flexible screen terminal further includes a strain sensor attached to a bending region of the rollable flexible member, and the strain sensor is configured to identify a folding angle between the at least two screen terminal portions by detecting a deformation state of the rollable flexible member, so that the foldable flexible screen terminal is able to adjust display content.

In one or more embodiments of the present disclosure, the foldable flexible screen terminal further includes a terminal portion magnetic strip unit, the terminal portion magnetic strip unit is located in one of the two adjacent screen terminal portions, and the terminal portion magnetic strip unit is capable of attracting a magnetic strip unit of a flexible member unit adjacent to the terminal portion magnetic strip unit.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship.

The inventors have found that in the design and manufacture of a flexible screen terminal, there is at least one of the following technical problems.

(1) The flexible screen bends the most in a totally folded state, which makes the flexible screen vulnerable to damage. Therefore, how to ensure that the flexible screen with the minimum radius of curvature is not damaged in the totally folded state becomes the first problem to be considered.

(2) The flexible screen terminal has a plurality of unfolded states, and how to make the two terminals of the screen have a relatively stable structural support at a certain angle (such as 120°, 150°, 180°) in a corresponding state also becomes a problem to be considered.

(3) How to ensure the connection of the bending region and the isolation of the internal space of the flexible screen terminal from the external environment in different folded states also becomes a problem to be considered.

Therefore, it is necessary to develop a foldable flexible screen terminal to solve at least one of the above problems.

Figure 1A:
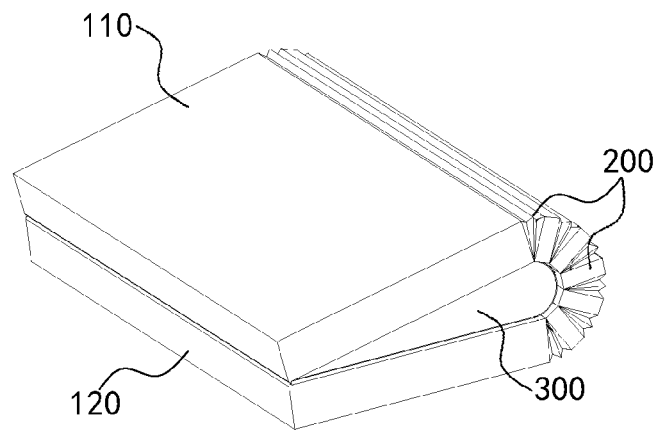
FIG. 1A is a stereogram of a foldable flexible screen terminal in a folded state according to an embodiment of the present disclosure.
Figure 1B:
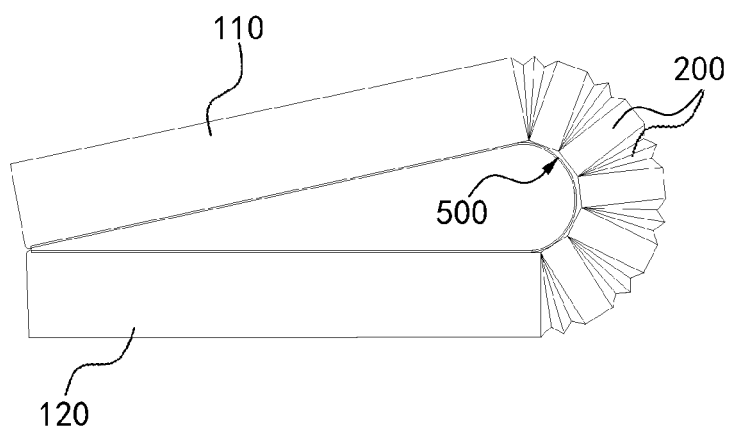
FIG. 1B is a lateral view of a foldable flexible screen terminal in a folded state according to an embodiment of the present disclosure.
Figure 2A:
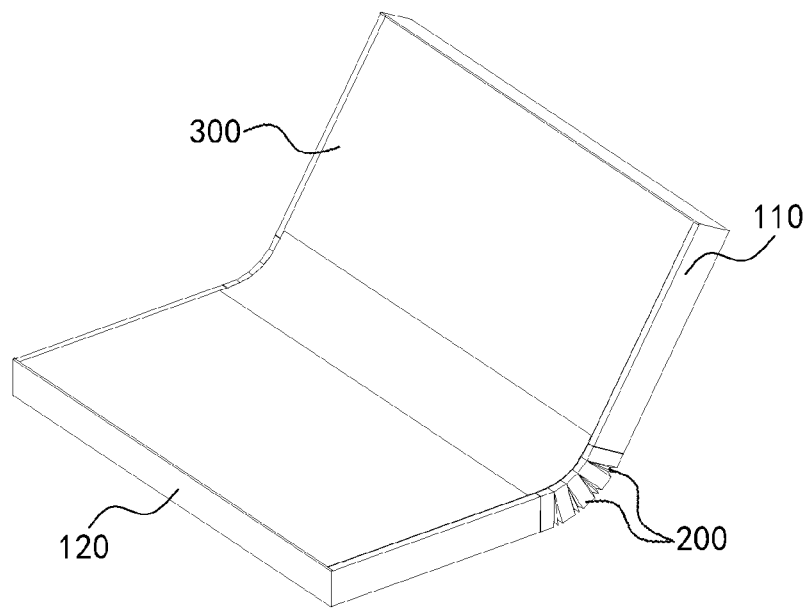
FIG. 2A is a stereogram of a foldable flexible screen terminal in a large-angle unfolded state according to an embodiment of the present disclosure.
Figure 2B:
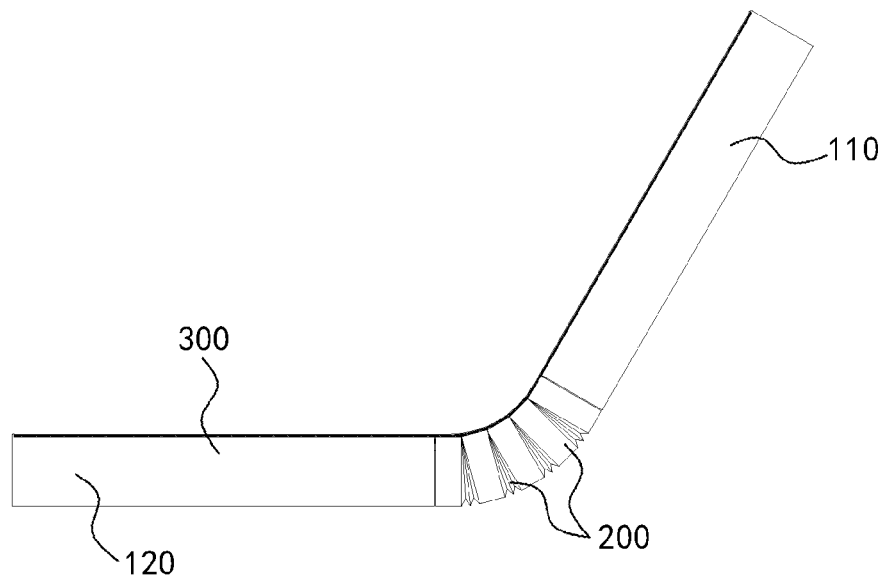
FIG. 2B is a lateral view of a foldable flexible screen terminal in a large-angle unfolded state according to an embodiment of the present disclosure.
Figure 3:
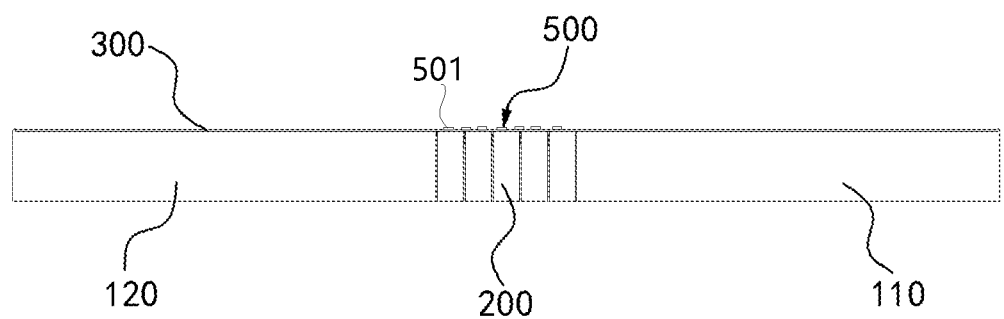
FIG. 3 is a lateral view of a foldable flexible screen terminal in a flat unfolded state according to an embodiment of the present disclosure.

FIG. 1A is a stereogram of a foldable flexible screen terminal in a folded state according to an embodiment of the present disclosure; FIG. 1B is a lateral view of a foldable flexible screen terminal in a folded state according to an embodiment of the present disclosure; FIG. 2A is a stereogram of a foldable flexible screen terminal in a large-angle unfolded state according to an embodiment of the present disclosure; FIG. 2B is a lateral view of a foldable flexible screen terminal in a large-angle unfolded state according to an embodiment of the present disclosure; and FIG. 3 is a lateral view of a foldable flexible screen terminal in a flat unfolded state according to an embodiment of the present disclosure.

As shown in FIG. 1A, FIG. 1B, FIG. 2A, FIG. 2B and FIG. 3, the foldable flexible screen terminal according to the embodiments of the present disclosure is a book-like folding structure, which can adapt to various states, including a folded state, a large-angle unfolded state and a flat unfolded state. In different states, the foldable flexible screen terminal corresponds to a variety of daily application scenarios, so as to meet the needs of different users, with high utility value and applicability.

For example, as shown in FIG. 1A, FIG. 1B, FIG. 2A, FIG. 2B and FIG. 3, the foldable flexible screen terminal according to the embodiments of the present disclosure includes two screen terminal portions 110, 120 (i.e., a right screen terminal portion and a left-screen terminal portion), a rollable flexible member 200 connecting the two screen terminal portions 110, 120 and located between the two screen terminal portions 110, 120, and a flexible screen layer 300 located on a same side of the two screen terminal portions 110, 120 and the rollable flexible member 200. For example, the screen terminal portion 120 may be referred to as a first screen terminal portion, or as a left screen terminal portion; the screen terminal portion 110 may be referred to as a second screen terminal portion, or as a right screen terminal portion.

For example, the two screen terminal sections 110, 120 may employ various existing screen terminals in the conventional technology, as long as they can satisfy display requirements. It should be understood that although the number of screen terminal portions employed in the embodiments is two, the embodiments of the present disclosure are not limited thereto. That is to say, the number of screen terminal portions can also be three or more. According to the inventive concept of the present application, three or more screen terminal portions can be successively connected to form a larger foldable flexible screen terminal according to actual needs.

Figure 4A:
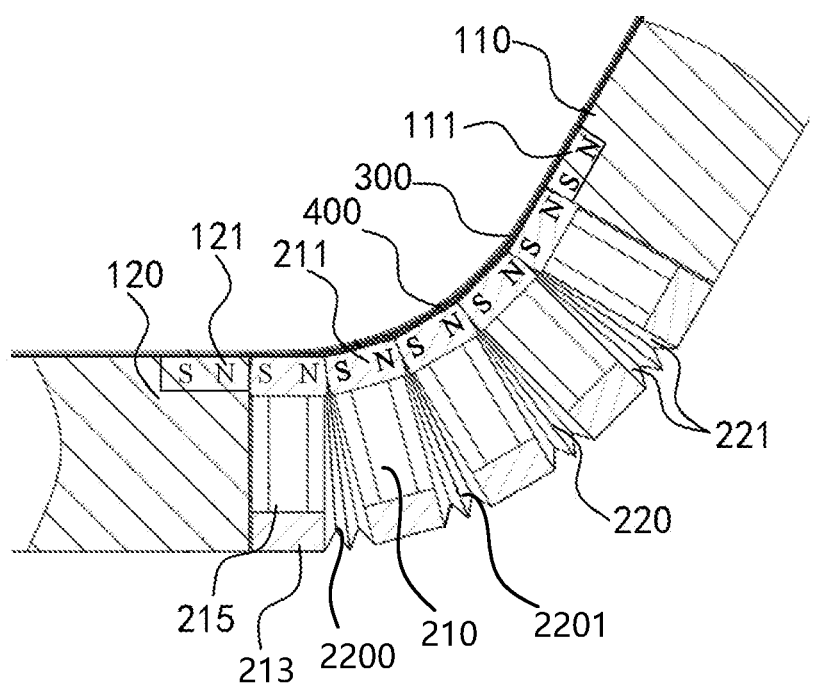
FIG. 4A is a partial lateral cross-sectional view of a bending region of a foldable flexible screen terminal according to an embodiment of the present disclosure.

FIG. 4A shows an internal structure of a bending region of a foldable flexible screen terminal according to an embodiment of the present disclosure. As shown in FIG. 4A, the rollable flexible member 200 has a plurality of flexible member units 210 and a plurality of bellows structures 220. Each bellows structure 220 connects adjacent two flexible member units 210 and is located between the adjacent two flexible member units 210. Of course, in other embodiments, the rollable flexible member 200 can further include a bellows structure 0220 connecting each of the screen terminal portions and the flexible member unit 210 adjacent to the screen terminal portion and located between the screen terminal portion and the flexible member unit 210 (referring to FIG. 7B). FIG. 7B shows only the bellows structure 0220 connecting the screen terminal portion 120 and the flexible member unit 210 adjacent to the screen terminal portion 120. A bellows structure 0220 can also be disposed between the screen terminal portion 110 and the flexible member unit 210 adjacent to the screen terminal portion 110. The plurality of flexible member units 210 and the plurality of bellows structure 220 enable the bending region of the foldable flexible screen terminal to maintain effective connection and reliable airtightness in the transformation process of different states, and play a role in protecting the internal components and other structural components. For example, the bellows structure 220 located between adjacent flexible member units 210 may be referred to as a first bellows structure 2200 (as shown in FIGS. 4A and 7B), and the bellows structure 220 located between a screen terminal portion and the flexible member unit 210 adjacent to the screen terminal portion may be referred to as a second bellows structure 0220 (as shown in FIG. 7B).

For example, as shown in FIG. 4A, each bellows structure 220 includes a plurality of foldable structures 2201, and adjacent foldable structures 2201 are connected. For example, the plurality of foldable structures 2201 can be integrally formed, but are not limited thereto. For example, each bellows structure 220 can be bonded between adjacent flexible member units 210, but is not limited thereto.

Figure 4B:
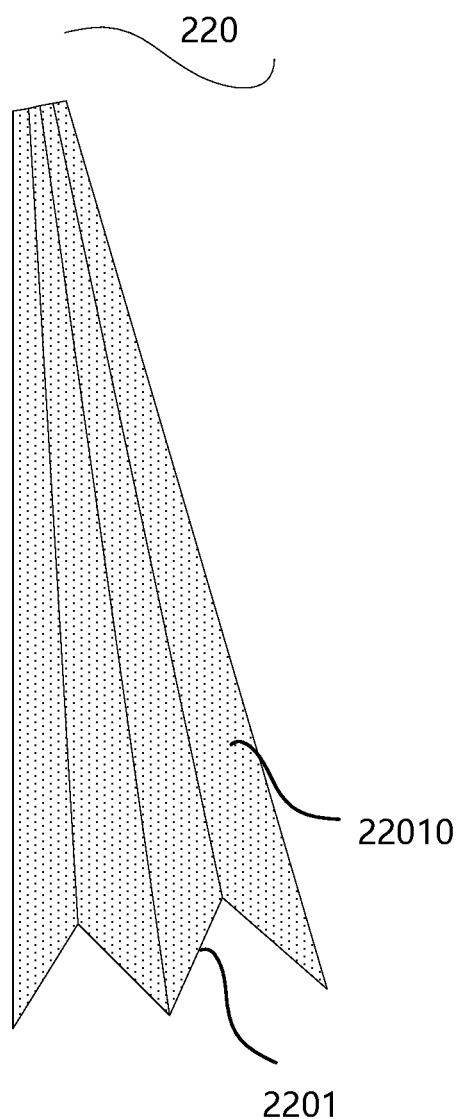
FIG. 4B is a schematic diagram of a micropore structure on a bellows surface of a bellows structure of a foldable flexible screen terminal according to an embodiment of the present disclosure.

FIG. 4B is a schematic diagram of a micropore structure on a bellows surface of a bellows structure of a foldable flexible screen terminal according to an embodiment of the present disclosure. FIG. 4B shows that a micropore structure 22010 is disposed on the bellows surface 221 of the bellows structure 220. For example, the bellows structure can be made of a gas-permeable and watertight material, but is not limited thereto.

Figure 5A:
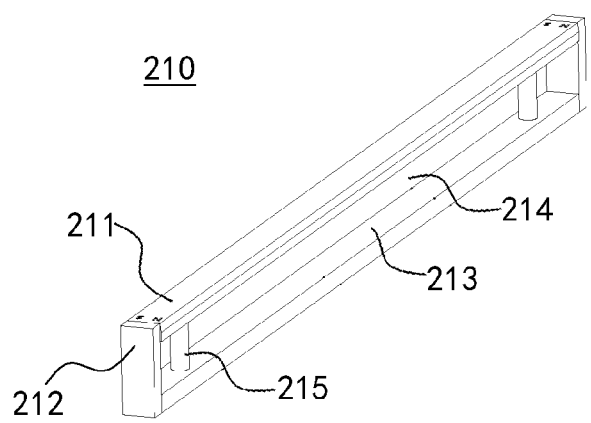
FIG. 5A is a stereogram of a flexible member unit in a foldable flexible screen terminal according to an embodiment of the present disclosure.
Figure 5B:
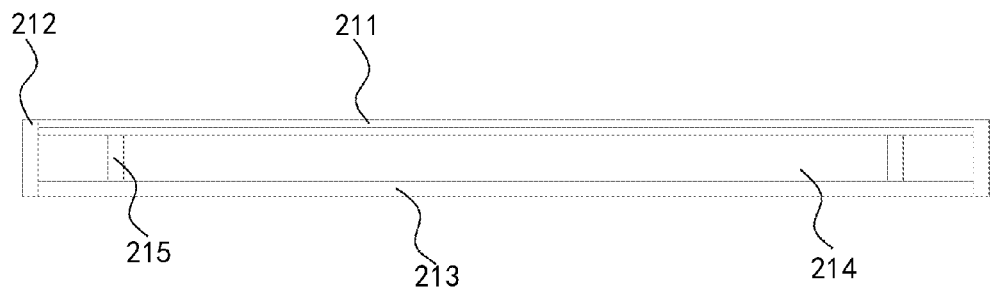
FIG. 5B is a lateral view of a flexible member unit in a foldable flexible screen terminal according to an embodiment of the present disclosure.

FIG. 5A is a stereogram of a flexible member unit in a foldable flexible screen terminal according to an embodiment of the present disclosure, and FIG. 5B is a lateral view of a flexible member unit in a foldable flexible screen terminal according to an embodiment of the present disclosure. The structure of the flexible member unit 210 will be described in detail below with reference to FIGS. 5A and 5B.

As shown in FIG. 5A, the flexible member unit 210 includes a magnetic strip unit 211, two lateral retaining walls 212 respectively connected to two ends of the magnetic strip unit, and an outer retaining wall 213 spaced apart from the magnetic strip unit 211 in parallel by a certain distance and connected to the two lateral retaining walls 212. Therefore, the magnetic strip unit 211, the two lateral retaining walls 212 and the outer retaining wall 213 jointly forming a hollow region 214.

For example, the magnetic strip unit 211 is a metal strip with magnetism, so that the left and right sides of the magnetic strip unit 211 can magnetically attract the adjacent magnetic strip units 211 to form an integral body. For example, the magnetic strip unit 211 allows the two screen terminal portions to be firmly fixed at a specific angle by magnetic attraction, thereby achieving the control adjustment of the rollable flexible member 200.

For example, referring to FIG. 4, in order to realize the connection between the two screen terminal portions 110, 120 and the flexible member unit 210 adjacent thereto, a right terminal portion magnetic strip unit 111 and a left terminal portion magnetic strip unit 121 can be respectively disposed on the two screen terminal portions 110, 120, whereby the right terminal portion magnetic strip unit 111 can magnetically attract a magnetic strip unit 211 adjacent thereto, and the left terminal portion magnetic strip unit 121 can magnetically attract a magnetic strip unit 211 adjacent thereto. The left terminal portion magnetic strip unit 121 may also be referred to as a first auxiliary magnetic strip unit, and the right terminal portion magnetic strip unit 111 may also be referred to as a second auxiliary magnetic strip unit.

For example, as shown in FIG. 5A, the two lateral retaining walls 212 and the outer retaining wall 213 of the flexible member unit 210 form a protective structure, which can protect internal components located in the hollow region 214 and block the influence of the external environment.

For example, as shown in FIG. 5A, in order to stabilize the structure of the flexible member unit 210 and avoid collapse when being pressed, the flexible member unit 210 can further include at least one support pillar 215, and the at least one support pillar 215 is located between the magnetic strip unit 211 and the outer retaining wall 213. The support pillar 215 is configured to support the magnetic strip unit 211 and the outer retaining wall 213. For example, the support pillar 215 is in contact with the magnetic strip unit 211 and the outer retaining wall 213, respectively. Although the number of the support pillars 215 employed in the embodiment is two, the embodiments of the present disclosure are not limited thereto. That is to say, the number of the support pillars 215 may also be one, three or more, which is set according to actual needs.

Figure 6A:
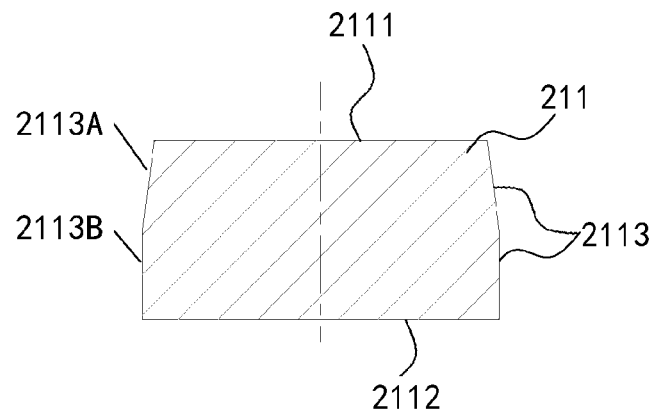
FIG. 6A is a cross-sectional view of a magnetic strip unit in a foldable flexible screen terminal according to an embodiment of the present disclosure.

FIG. 6A is a cross-sectional view of a magnetic strip unit in a foldable flexible screen terminal according to an embodiment of the present disclosure. As shown in FIG. 6A, the magnetic strip unit 211 includes a top surface 2111, a bottom surface 2112, and two side surfaces 2113 between the top surface 2111 and the bottom surface 2112. The cross section of the magnetic strip unit 211 has a symmetrical irregular shape, so as to help corresponding to different working states of the foldable flexible screen terminal.

As shown in FIG. 6A, each side surface 2113 of the magnetic strip unit 211 includes a first contact surface 2113A at an obtuse angle to the top surface 2111 and a second contact surface 2113B at a right angle to the top surface 2111. When the foldable flexible screen terminal is in a large-angle unfolded state (referring to FIGS. 2A and 2B), the first contact surfaces 2113A of adjacent two magnetic stripe units 211 attract to contact with each other, and the second contact surfaces 2113B thereof are away from each other and are not in contact with each other. When the foldable flexible screen terminal is in a flat unfolded state (referring to FIG. 3), the second contact surfaces 2113B of the adjacent two magnetic stripe units 211 attract to contact with each other, and the first contact surfaces 2113A thereof are away from each other and are not in contact with each other.

Figure 6B:
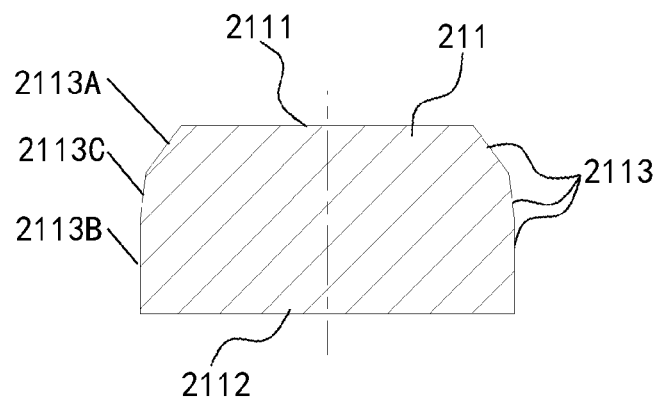
FIG. 6B is a cross-sectional view of a magnetic strip unit in a foldable flexible screen terminal according to an embodiment of the present disclosure.

FIG. 6B is a cross-sectional view of a magnetic strip unit in a foldable flexible screen terminal according to an embodiment of the present disclosure. As shown in FIG. 6B, each side surface 2113 of the magnetic strip unit 211 includes, in addition to the first contact surface 2113A at an obtuse angle to the top surface 2111 and the second contact surface 2113B at a right angle to the top surface 2111, a third contact surface 2113C located therebetween. The third contact surface 2113C allows for a smoother folding and unfolding of the foldable flexible screen terminal in a large-angle unfolded state, and a more accurate folding or unfolding angle. For example, the third contact surface 2113C is at an acute angle to the top surface, but is not limited thereto.

It should be understood that the symmetrical irregular shape of the cross section of the magnetic strip unit 211 is not limited thereto, and can be adjusted according to requirements and magnetic strip characteristics.

Figure 7A:
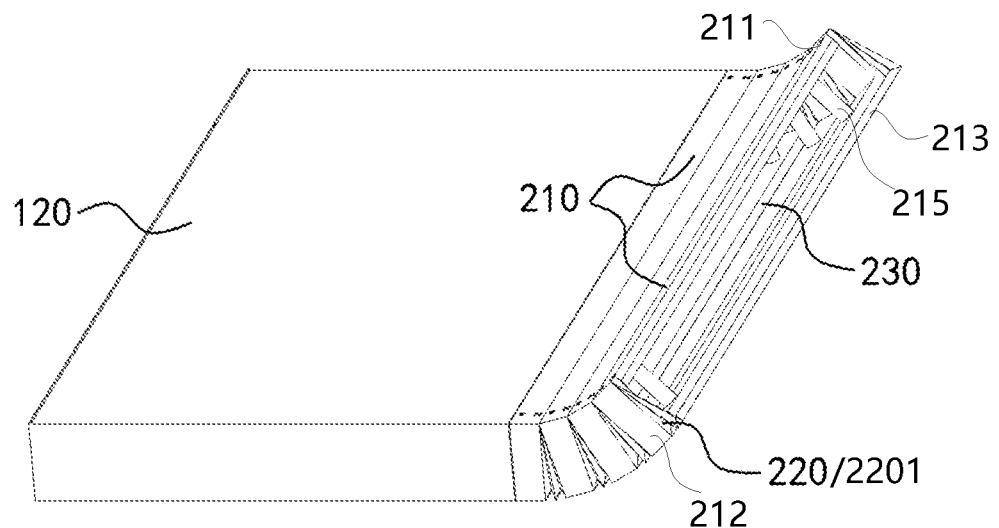
FIG. 7A is a schematic diagram of a left screen terminal portion and a part of rollable flexible member in a foldable flexible screen terminal viewed from an angle according to an embodiment of the present disclosure.
Figure 7B:
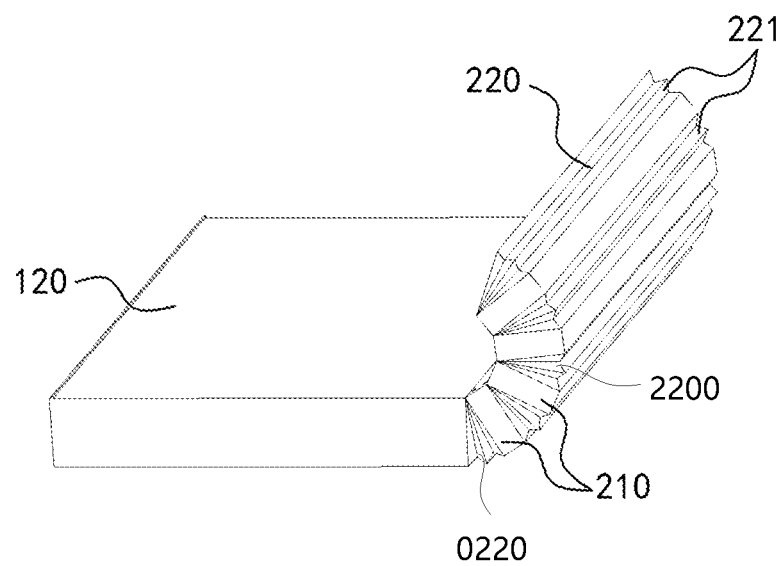
FIG. 7B is a schematic diagram of a left screen terminal portion and a part of rollable flexible member in a foldable flexible screen terminal viewed from another angle according to an embodiment of the present disclosure.
Figure 7C:
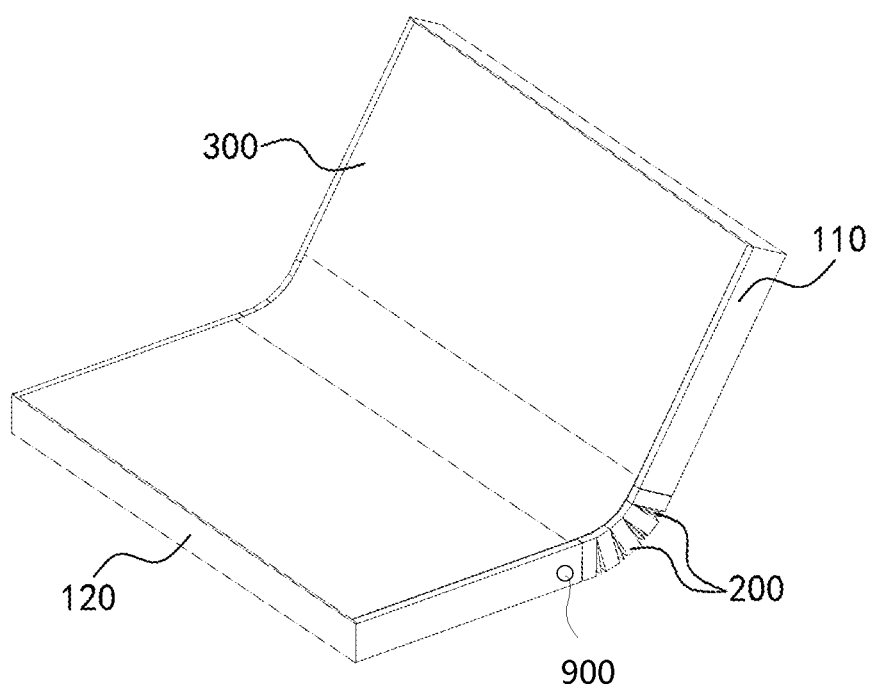
FIG. 7C is a schematic diagram of a foldable flexible screen terminal according to an embodiment of the present disclosure.

FIG. 7A is a schematic diagram of a left screen terminal portion and a part of rollable flexible member in a foldable flexible screen terminal viewed from an angle according to an embodiment of the present disclosure. FIG. 7B is a schematic diagram of a left screen terminal portion and a part of rollable flexible member in a foldable flexible screen terminal viewed from another angle according to an embodiment of the present disclosure. FIG. 7C is a schematic diagram of a foldable flexible screen terminal according to an embodiment of the present disclosure.

As shown in FIG. 7A, the hollow regions 214 of the plurality of flexible member units 210 collectively form a receiving space 230 of the rollable flexible member 200, and the receiving space 230 is configured to receive a flexible circuit board, a connection line and component (not shown) and the like for connecting the two screen terminal portions 110, 120.

Referring to FIG. 4A again, FIG. 4A shows the bellows structure 220 in detail. The bellows structure 220 is in a fan shape at a certain angle, so as to be foldable and unfoldable, so that the two screen terminal portions 110, 120 can be smoothly unfolded or folded in a folding process. The unfolding angle of the bellows structure 220 increases as the foldable flexible screen terminal is folded (referring to FIGS. 1A, 1B, and 7B) and decreases as the foldable flexible screen terminal is unfolded (referring to FIGS. 2A and 2B). For example, when the foldable flexible screen terminal is flat unfolded, the bellows structure 220 is folded into the hollow region 214 of the flexible member unit 210 with good concealment (referring to FIG. 3). Therefore, in different states of the foldable flexible screen terminal, the bellows structure 220 can be smoothly unfolded and folded, thereby achieving the connection of the bending region and separating the internal space of the foldable flexible screen terminal from the external environment to form a local closed space.

For example, a micropore structure 22010 (shown in FIG. 4B) is arranged on the bellows surface 221 (shown in FIGS. 4A and 4B) of the bellows structure 220, and the micropore structure allows air to enter and exit the internal space of the foldable flexible screen terminal (for example, the receiving space 230) and blocks liquid from entering the internal space of the foldable flexible screen terminal. Therefore, when the foldable flexible screen terminal is folded and unfolded, the micropore structure can allow air to be drawn in and out due to the volume change of the internal space, thereby allowing the foldable flexible screen terminal to be smoothly folded and unfolded, and avoiding deformation of the bellows structure 220 due to the volume change of the internal space.

Of course, the embodiments of the present disclosure are not limited thereto, and an air vent 900 (shown in FIG. 7C) can be provided at a position of a headphone hole or a charging hole or the like of the foldable flexible screen terminal, for ventilating the internal space of the foldable flexible screen terminal with the external environment, which also ensures that the foldable flexible screen terminal can be smoothly folded and unfolded.

The flexible screen layer 300 of the foldable flexible screen terminal serves as a display part of the foldable flexible screen terminal, the display technology thereof can be an OLED flexible display technology, and it can be disposed on a same side of the two screen terminal portions 110, 120 and the rollable flexible member 200 in a common manner in the art.

For example, as shown in FIG. 4A, the foldable flexible screen terminal can further include a buffer layer 400 having elasticity, and the buffer layer 400 is disposed below the flexible screen layer 300, and bonds the flexible screen layer 300 to the two screen terminal portions 110, 120 and the rollable flexible member 200. The buffer layer 400 can have at least one of the following characteristics.

(1) The buffer layer 400 is a soft material having a double-sided adhesive to bond the flexible screen layer 300 to an underlying structure.

(2) The buffer layer 400 has a certain buffering function, and can eliminate the influence of, the surface unevenness of the screen terminal portion 110 and the screen terminal portion 120 or the surface uneven at the overlapping positions of the plurality of magnetic stripe units 210 of the rollable flexible member 200, on the display performance of the flexible screen.

(3) The buffer layer 400 has a certain elasticity, and can be stretched or contracted along a laying surface thereof to some extent in the process of folding or unfolding the foldable flexible screen terminal, so as to eliminate the influence of the flexible screen layer 300 being folded in the bending region, and to protect the flexible screen layer 300 from being over-stretched or over-compressed.

For example, as shown in FIG. 7A, the bellows structure 220/foldable structure 2201 can be connected to the lateral retaining wall 212 of the flexible member unit 210, but is not limited thereto.

For example, the foldable flexible screen terminal can additionally include a strain sensor 500 (shown in FIG. 3) attached to the bending region of the rollable flexible member 200, and the strain sensor 500 is configured to identify a folding angle between the two screen terminal portions 110, 120, by detecting a deformation state of the rollable flexible member, so that the foldable flexible screen terminal is able to adjust display content to meet the needs of different sizes and utility scenarios. For example, the strain sensor 500 includes a plurality of strain sub-sensors 501.

For example, in the folded state shown in FIGS. 1A and 1B, the strain sensor 500 identifies that the folding angle between the two screen terminal portions 110, 120 is close to 180 degrees, that is, the two screen terminal portions 110, 120 are overlapped and nearly parallel to each other, and thus, the foldable flexible screen terminal is temporarily suspended, the flexible screen layer 300 of the foldable flexible screen terminal is turned off, and no content is displayed, thereby saving power.

In the large-angle unfolded state shown in FIGS. 2A and 2B, the strain sensor 500 identifies that the folding angle between the two screen terminal portions 110, 120 is an obtuse angle, and the foldable flexible screen terminal is in a partially displayable operation state. The flexible screen layer 300 on the two screen terminal sections 110, 120 can respectively display different contents. For example, the flexible screen layer 300 on the screen terminal portion 110 displays a picture, and the flexible screen layer 300 on the screen terminal portion 120 displays a keyboard for the user to operate to control the display content of the display picture.

In the flat unfolded state shown in FIG. 3, the strain sensor 500 identifies that the folding angle between the two screen end portions 110, 120 is close to zero degree, that is, the two screen terminal portions 110, 120 do not overlap and are nearly located in a same plane, and thus, the foldable flexible screen terminal is in a full display viewing state, and the flexible screen layer 300 on the two screen terminal portions 110, 120 forms a complete display screen which can display a larger picture.

For example, in a case where the foldable flexible screen terminal is provided with the buffer layer 400, the strain sensor 500 can be attached to the buffer layer 400 located in the bending region.

Therefore, the foldable flexible screen terminal according to the embodiments of the present disclosure can be adapted to various display states of the flexible screen layer 300 via the control adjustment of the rollable flexible member 200, including the folded state, the large-angle unfolded state, and the flat unfolded state, corresponding to a variety of daily application scenarios and having high utility value.

Beneficial effects of the embodiments of the present disclosure include at least one of the following.

(1) The foldable flexible screen can be adapted to various folded states via the control adjustment of the rollable flexible member, so that the flexible screen terminal in different states can correspond to various daily application scenarios and meet the needs of different users.

(2) The foldable flexible screen according to the embodiments of the present disclosure can realize the connection of the bending region and the isolation of the internal space of the flexible screen terminal from the external environment, and has high utility value and applicability.

(3) The foldable flexible screen according to the embodiments of the present disclosure can be adapted to various folded states without being easily damaged, and obtain a relatively stable structural support depending on the rollable flexible member in different states, and realize the connection of the bending region and the isolation of the internal space of the flexible screen terminal from the external environment. Therefore, the flexible screen terminal can correspond to various daily application scenarios and has high utility value.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A foldable flexible screen terminal, comprising:
   at least two screen terminal portions;
   a rollable flexible member, two adjacent screen terminal portions being connected by the rollable flexible member, the rollable flexible member comprising a plurality of flexible member units and a plurality of bellows structures, each of the plurality of bellows structures being foldable and unfoldable, the plurality of bellows structures comprising a plurality of first bellows structures, and two adjacent flexible member units being connected by one of the plurality of first bellows structures, wherein each of the plurality of flexible member units comprises a magnetic strip unit, and magnetic strip units of the adjacent flexible member units are capable of attracting each other to form an integral body.

2. The foldable flexible screen terminal according to claim 1, wherein the flexible member unit further comprises:
   two lateral retaining walls, located at two ends of the magnetic strip unit, respectively; and
   an outer retaining wall, spaced apart from the magnetic strip unit and located between the two lateral retaining walls, the outer retaining wall being connected with the two lateral retaining walls, so that the magnetic strip unit, the two lateral retaining walls and the outer retaining wall jointly forming a hollow region.

3. The foldable flexible screen terminal according to claim 2, wherein the hollow regions of the plurality of flexible member units collectively form a receiving space of the rollable flexible member.

4. The foldable flexible screen terminal according to claim 3, wherein a micropore structure is arranged on a bellows surface of the bellows structure, the micropore structure is configured to allow air to enter and exit the receiving space and to block liquid from entering the receiving space.

5. The foldable flexible screen terminal according to claim 3, wherein an air vent is provided in the foldable flexible screen terminal, and the air vent is configured to ventilate the receiving space with an external environment.

6. The foldable flexible screen terminal according to claim 2, wherein the flexible member unit further comprises at least one support pillar, and the at least one support pillar is located between the magnetic strip unit and the outer retaining wall.

7. The foldable flexible screen terminal according to claim 1, wherein a cross section of the magnetic strip unit has a symmetrical irregular shape.

8. The foldable flexible screen terminal according to claim 7, wherein the magnetic strip unit comprises a top surface, a bottom surface, and two side surfaces between the top surface and the bottom surface, each of the side surfaces comprises a first contact surface at an obtuse angle to the top surface and a second contact surface at a right angle to the top surface.

9. The foldable flexible screen terminal according to claim 8, wherein each of the side surfaces further comprises a third contact surface between the first contact surface and the second contact surface, and the third contact surface is connected with the first contact surface and the second contact surface.

10. The foldable flexible screen terminal according to claim 9, wherein the third contact surface is at an acute angle to the top surface.

11. The foldable flexible screen terminal according to claim 1, wherein the magnetic strip units of the plurality of flexible member units are located at the same side of the rollable flexible member.

12. The foldable flexible screen terminal according to claim 1, wherein the plurality of bellows structures comprise a second bellows structure, each of adjacent screen terminal portions is connected to the flexible member unit adjacent to the one of adjacent screen terminal portions via the second bellows structure.

13. The foldable flexible screen terminal according to claim 1, further comprising a flexible screen layer, wherein the flexible screen layer is located on a same side of the at least two screen terminal portions and the rollable flexible member, the flexible screen layer is configured to serve as a display part of the foldable flexible screen terminal.

14. The foldable flexible screen terminal according to claim 13, further comprising a buffer layer, wherein the buffer layer is located on a side of the flexible screen layer close to the rollable flexible member, and is configured to bond the flexible screen layer to the at least two screen terminal portions and the rollable flexible member.

15. The foldable flexible screen terminal according to claim 14, wherein the flexible screen layer is located on a side of the rollable flexible member where the magnetic strip unit is provided.

16. The foldable flexible screen terminal according to claim 1, further comprising a strain sensor attached to a bending region of the rollable flexible member, wherein the strain sensor is configured to identify a folding angle between the at least two screen terminal portions by detecting a deformation state of the rollable flexible member, so that the foldable flexible screen terminal is able to adjust display content.

17. The foldable flexible screen terminal according to claim 1, further comprising a terminal portion magnetic strip unit, wherein the terminal portion magnetic strip unit is located in one of the two adjacent screen terminal portions, and the terminal portion magnetic strip unit is capable of attracting a magnetic strip unit of a flexible member unit adjacent to the terminal portion magnetic strip unit.

18. A foldable flexible screen terminal, comprising:
at least two screen terminal portions;
a plurality of bellows structures; and
a plurality of connection units,
wherein the plurality of bellows structures and the plurality of connection units are arranged alternately to form a bendable connection member, and the at least two screen terminal portions are connected with each other through the bendable connection member,
wherein each of the plurality of connection units comprises a magnetic strip unit, and magnetic strip units of the adjacent connection member units are capable of attracting each other to form an integral body.

* * * * *